United States Patent
Takagi et al.

(10) Patent No.: US 6,987,077 B2
(45) Date of Patent: Jan. 17, 2006

(54) FIRED SPINEL COMPLEX OXIDE AND METHOD FOR PREPARING THE SAME

(75) Inventors: Nobuo Takagi, Shunan (JP); Masami Tadasa, Shunan (JP)

(73) Assignee: Nippon Chemical Industrial Co., Ltd., Tokyo (JP)

(*) Notice: Subject to any disclaimer, the term of this patent is extended or adjusted under 35 U.S.C. 154(b) by 0 days.

(21) Appl. No.: 10/864,487

(22) Filed: Jun. 10, 2004

(65) Prior Publication Data

US 2004/0254058 A1    Dec. 16, 2004

(30) Foreign Application Priority Data

Jun. 13, 2003  (JP) .............................. 2003-169179

(51) Int. Cl.
  *C01B 35/44*  (2006.01)
(52) U.S. Cl. ...................... 501/114; 501/117; 501/120; 501/121; 501/122; 501/128; 501/132; 501/133; 501/153; 501/154
(58) Field of Classification Search ................ 501/114, 501/117, 120, 121, 122, 128, 132, 133, 153, 501/154
See application file for complete search history.

(56) References Cited

U.S. PATENT DOCUMENTS 4,751,208 A * 6/1988 Aoki et al. ................. 501/114

FOREIGN PATENT DOCUMENTS

| JP | 47023390 A | * | 10/1972 |
| JP | 62036061 A | * | 2/1987 |
| JP | 03205357 A | * | 9/1991 |

* cited by examiner

*Primary Examiner*—David Sample
(74) *Attorney, Agent, or Firm*—Westerman, Hattori, Daniels & Adrian, LLP

(57) ABSTRACT

A fired spinel complex oxide is produced by firing a mixture containing a slag by-produced in chromium refining, a reducer, and a silica-containing material, and is essentially composed of: 29 to 40 percent by weight of $Fe_2O_3$; 15 to 20 percent by weight of $Al_2O_3$; 9 to 14 percent by weight of MgO; 0 to 4 percent by weight of $Na_2O$; 9 to 17 percent by weight of $Cr_2O_3$; 14 to 20 percent by weight of $SiO_2$; and 2 percent by weight or less of CaO. The fired spinel complex oxide shows a Cu—Kα X-ray diffraction pattern in which the ratio (b/a) of the diffraction peak intensity of the silica-containing material (b) in the vicinity of $2\theta=26.7°$ to the {113} plane diffraction peak intensity (a) in the vicinity of $2\theta=36°$ is 0.1 or less.

13 Claims, 2 Drawing Sheets

FIRED SPINEL COMPLEX OXIDE AND METHOD FOR PREPARING THE SAME

BACKGROUND OF THE INVENTION

1. Field of the Invention

The present invention relates to a fired spinel complex oxide intending to recycle slag by-produced in chromium refining, and to a method for preparing the same. More specifically, the present invention relates to a fired spinel complex oxide from which alkaline components or chromium components do not leach and which is used for water-retentive and well-drained artificial aggregate, and to a method for preparing the same.

2. Description of the Related Art

For production of sodium chromate, in general, a mixture of chrome ore, soda ash, lime, and filler is oxidized and roasted at high temperature, and the roasted product is immersed in water to extract sodium chromate. Unfortunately, this process provides a large amount of leached residue.

The leached residue contains toxic hexavalent chromium, which pollutes soil and water to cause environmental deterioration if the residue is disposed of as it is. Therefore the residue is subjected to detoxification before disposal.

For example, Japanese Unexamined Patent Application Publication No. 48-32767 has disclosed the process of blending a residue of sodium chromate extraction with a reducer in an amount of 1 to 20 percent by weight to the residue and a material containing silica in a $SiO_2/CaO$ ratio of at least 1, and subsequently firing the mixture. For a residue of water extraction of chromates by-produced in sodium chromate and sodium dichromate production, Japanese Examined Patent Application Publication No. 47-35675 has disclosed the process of blending the residue with about 1 to 15 percent by weight of waste sulfuric acid containing oil, sulfate pitch, waste chlorinated hydrocarbon oil, or waste heavy oil. For chromium powder residue, Japanese Examined Patent Application publication No. 50-25915 has disclosed the process of roasting a mixture of the residue and activated carbon in a gas atmosphere with a low oxygen concentration at a temperature in the range of 400 to 1,000° C. and at a material temperature of 700° C. or less, and rapidly cooling it. Japanese Unexamined Patent Application Publication No. 47-23390 has disclosed the process of roasting a mixture of chromium powder slag, coke breeze, and powder clay at a temperature in the range of 1,000 to 1,300° C., and Japanese Unexamined Patent Application Publication 47-20089 has disclosed the process of roasting a mixture of chromium powder residue and activated carbon in a gas atmosphere with a low oxygen concentration at a temperature in the range of 400 to 1,000° C., and rapidly cooling it. Japanese Examined Patent Application Publication No. 50-25916 has disclosed the process of roasting a mixture of powder chromium slag, powder coke, and powder clay at a temperature in the range of 1,000 to 1,300° C. For a powder or granular slag produced in a sodium dichromate production, Japanese Examined Patent Application Publication No. 47-23319 has disclosed the process of blending or coating the slag with clay power and roasting the mixture or the coated material at a temperature in the range of 1,000 to 1,300° C.

In these processes, however, the detoxificated material is only disposed of, but not recycled.

One reason why the detoxificated material is not recycled is that it cannot ensure safety when recycled.

The inventors of the present invention have proposed the use of chromium slag in the field of ceramics in Japanese Unexamined Patent Application Publication Nos. 51-41009, 51-81806, and 59-92968.

The inventors have also proposed a fired spinel complex oxide (Japanese Unexamined Patent Application Publication No. 62-12661), a colorant for ceramics (Japanese Unexamined Patent Application Publication No. 62-36061, and another fired spinel complex oxide (Japanese Unexamined Patent Application Publication 3-205357) which are prepared from a chromium slag having a low calcium content and intend for recycling. The former fired spinel complex oxide is a reaction-sintered compact essentially composed of quartz and a solid solution spinel in which at least Al, Fe, and Cr interdiffuse, according to chemical composition analysis and X-ray diffraction analysis. This compact has a thermal conductivity of 1.3 to 2.5 kcal/mh° C. and a specific resistance of $10^2$ to $10^7$ Ωcm. The colorant is a chromium-containing iron composition containing as a principal constituent a solid solution spinel in which at least Fe and Cr interdiffuse, according to chemical composition analysis and X-ray diffraction analysis. The composition is fine powder having a Blaine specific surface of 2,000 to 5,000 $cm^2/g$. The latter fired spinel complex oxide is a reaction-sintered compact of chromium slag powder and clay, essentially composed of quartz and a solid solution spinel in which at least Al, Fe, and Cr interdiffuse, according to chemical composition analysis and X-ray diffraction analysis. This compact has a thermal conductivity of 1.3 to 2.5 kcal/mh° C. and a specific resistance of $10^2$ to $10^7$ Ωcm.

SUMMARY OF THE INVENTION

In view of the above-described known art, the inventors of the present invention conducted research for pollution-free material produced by recycling slag by-produced in chromium refining. As a result, the inventers found that a reaction precursor prepared by granulating or pressing a mixture in which particles of a slag by-produced in chromium refining having a specific composition with a calcium content lower than ever before, a reducer, a material containing silica, and water are uniformly dispersed forms a solid solution spinel phase containing at least Mg, Al, Cr, and Fe in terms of X-ray diffraction analysis, by firing at a specific temperature. In the solid solution spinel phase, detoxificated chromium and alkaline components interdiffuse to provide a stable fired product having heat resistance. The fired product does not allow chromium and alkaline components from leaching even under harsh conditions as pulverized or placed in acid or alkali, and has superior water retentivity and well-drained characteristics. Thus the inventor accomplished the present invention.

Accordingly, an object of the present invention is to provide a heat-resistant and recyclable fired spinel complex oxide prepared from a by-product slag of chromium refining, the fired spinel complex oxide from which chromium and alkaline components do not leach even under harsh conditions as pulverized or placed in acid or alkali.

According to an aspect of the present invention, there is provided a fired spinel complex oxide produced by firing a mixture containing a slag by-produced in chromium refining, a reducer, and a material containing silica. The fired spinel complex oxide is essentially composed of:

29 to 40 percent by weight of $Fe_2O_3$;
15 to 20 percent by weight of $Al_2O_3$;
9 to 14 percent by weight of MgO;
0 to 4 percent by weight of $Na_2O$;

9 to 17 percent by weight of $Cr_2O_3$;

14 to 20 percent by weight of $SiO_2$; and 2 percent by weight or less of CaO.

The fired spinel complex oxide shows a Cu—Kα X-ray diffraction pattern in which the ratio (b/a) of the diffraction peak intensity of the silica-containing material (b) in the vicinity of 2θ=26.7° to the {113} plane diffraction peak intensity (a) in the vicinity of 2θ=36° is 0.1 or less.

According to another aspect of the present invention, a method for preparing a fired spinel complex oxide is provided. The method includes the following three steps:

The first step of blending a slag by-produced in chromium refining, a reducer, a material containing silica, and water to prepare a mixture comprising particles having a mean grain size of 100 μm or less, the slag being essentially composed of 39 to 44 percent by weight of $Fe_2O_3$, 13 to 19 percent by weight of $Al_2O_3$, 10 to 14 percent by weight of MgO, 0 to 4 percent by weight of $Na_2O$, 13 to 20 percent by weight of $Cr_2O_3$, 2 percent by weight or less of CaO;

The second step of subjecting the mixture to granulation or pressure forming to prepare a reaction precursor; and The third step of firing the reaction precursor at a temperature of 950° C. or more and subsequently cooling the fired product.

The fired spinel complex oxide of the present invention has a heat resistance of 400° C. or more, and does not allow chromium and alkaline components from leaching even under harsh conditions as pulverized or placed in a high-temperature environment or in acid or alkali and is thus harmless and recyclable. Furthermore, the fired product has superior water retentivity and well-drained characteristics in view of recycling. Accordingly, it can be advantageously used as artificial aggregate, such as sand for mortar, lightweight aggregate, aggregate for roads, and materials for landfill of building land and seaside, and various materials for structural engineering and their raw materials.

DESCRIPTION OF THE PREFERRED EMBODIMENTS

Figure 1:
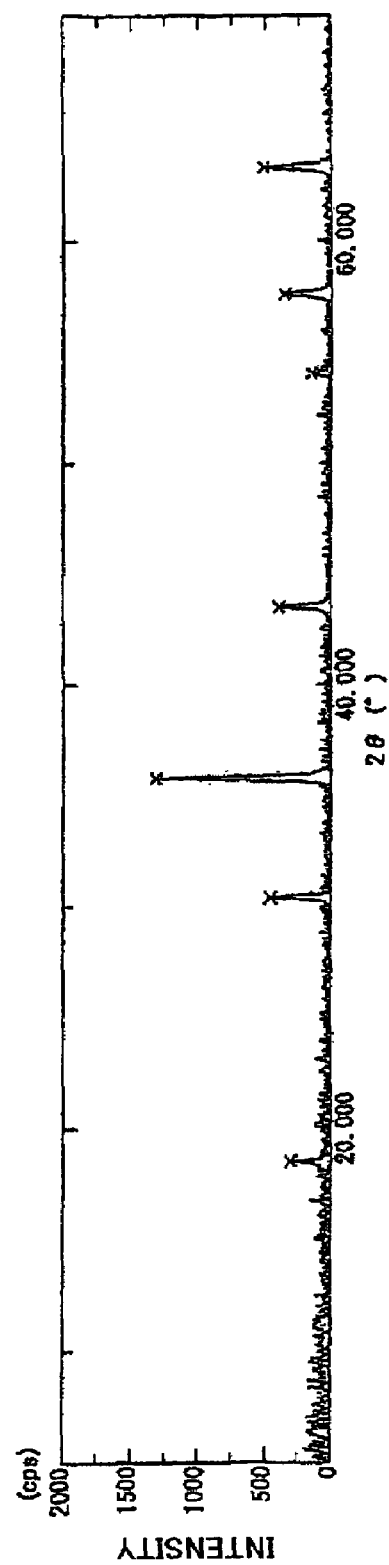
FIG. 1 is an X-ray diffraction pattern of a fired spinel complex oxide prepared in Example 1.

The present invention will now be described in detail.

A fired spinel complex oxide of the present invention is produced by blending at least a by-product slag of chromium refining, a reducer, and a material containing silica, and firing the mixture.

The by-product slag is a large amount of residue remaining after extraction of sodium chromate by immersing an oxidized and roasted mixture of chrome ore and an alkali in water.

The fired spinel complex oxide is essentially composed of:

29 to 40 percent by weight, and preferably 30 to 38 percent by weight of $Fe_2O_3$;

15 to 20 percent by weight, and preferably 16 to 19 percent by weight of $Al_2O_3$;

9 to 14 percent by weight, and preferably 9 to 13 percent by weight of MgO;

0 to 4 percent by weight, and preferably 3 percent by weight or less of $Na_2O$;

9 to 17 percent by weight, and preferably 12 to 15 percent by weight of $Cr_2O_3$;

14 to 20 percent by weight, and preferably 15 to 18 percent by weight, of $SiO_2$; and 2 percent by weight or less of CaO, and preferably 1 percent by weight or less, in such an amount as not to contain CaO substantially.

Since the fired spinel complex oxide of the present invention does not substantially contain CaO, in other wards, since the slag using as a raw material by-produced in the chromium refining does not substantially contain CaO, the resulting fired spinel complex oxide does not contain calcium chromate derived from the slag or by-produced in the production process. Accordingly, the fired product does not allow the leaching of hexavalent chromium, which is derived from calcium chromate, even under harsh conditions as pulverized or placed in a high-temperature environment or in acid or alkali, and is thus harmless and recyclable.

In addition, it is important that the fired spinel complex oxide shows a Cu—Kα X-ray diffraction pattern in which the ratio (b/a) of the diffraction peak intensity of the silica-containing material (b) in the vicinity of 2θ= 26.7° to the {113} plane diffraction peak intensity (a) in the vicinity of 2θ=36° is 0.1 or less, preferably 0.05 or less.

Specifically, the raw material silica-containing material is substantially absent from the fired spinel complex oxide, in terms of X-ray diffraction analysis.

The {113}plane diffraction peak (a) in the vicinity of 2θ=36° refers to a peak at 36°±0.2°. The diffraction peak (b) in the vicinity of 2θ=26.7° refers to a peak at 26.7°±0.2°.

The raw material containing silica gives a suitable strength to the grains of the resulting fired spinel complex oxide, and immobilizes $Na_2O$ and CaO being by-products of reduction of hexavalent chromium in silicate form, as shown in following equations (1), (1'), (2), and (2'):

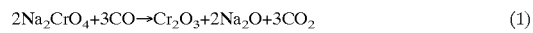  (1)

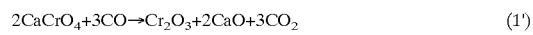  (1')

  (2)

  (2')

Thus, immobilization of the alkaline components prevents the reduced $Cr^{+3}$ from being restored to $Cr^{+6}$ at high temperature.

The fired spinel complex oxide has an X-ray diffraction peak intensity ratio (b/a) in the above-described range; hence it does not substantially have the diffraction peak based on the silica-containing material. The silicates containing the immobilized alkaline components, which are shown by the disappearance of this diffraction peak, interdiffuse in the spinel phase to be further stabilized in a solid solution. Consequently, the fired spinel complex oxide of the present invention exhibits an adequate strength and heat resistance, and does not allow chromium and alkaline components from leaching even under harsh conditions as pulverized or placed in a high-temperature environment or in acid or alkali and is thus harmless and recyclable.

The fired spinel complex oxide of the present invention has the above-described composition, and the Cu—Kα X-ray diffraction pattern of the fired spinel complex oxide has diffraction peaks of the {113} plane in the vicinity of 2θ= 36°, the {202} plane in the vicinity of 2θ=31°, the {333} plane in the vicinity of 2θ=58°, and the {404} plane in the vicinity of 2θ=63°, but substantially no peak based on the silica-containing material (b) in the vicinity of 2θ= 26.7°. Thus, the fired spinel complex oxide has only a spinel phase expressed by formula (3):

$$Mg(Al_xFe_yCr_{1-x-y})_2O_4 \quad (3)$$

wherein x and y satisfy the relationships 0.267≦x≦0.349, 0.322≦y≦0.411, and x+y<1. Thus, the fired spinel complex oxide is pure in terms of X-ray diffraction analysis.

The form of the fired spinel complex oxide of the present invention is not particularly limited, and any form may be provided according to the process for preparing the fired spinel complex oxide, including granular, pulverized, and plate forms. For example, a preferred process of the present invention, described later, provides grains having a mean grain size in the range of 0.5 to 25 mm, and the grains may be arbitrarily pulverized to fine particles having a mean grain size of 20 μm or less.

The fired spinel complex oxide is in grain form having an adequate strength. The grains having mean grain size in the range of 0.5 to 25 mm exhibit a uniaxial compressive strength of at least 1 MPa, preferably at least 2 MPa, and are accordingly used without deformation.

The fired spinel complex oxide of the present invention exhibits superior water retentivity and well-drained characteristics because it is porous, that is, has air voids. Specifically, a fired spinel complex oxide with a mean grain size in the range of 0.5 to 25 mm exhibits a water absorption in the range of 16 to 23 percent by weight, preferably 18 to 21 percent by weight, and a permeability coefficient at 20° C. in the range of 0.001 to 0.005 cm/s, preferably 0.002 to 0.004 cm/s.

The water absorption herein is obtained from following equation (1) in accordance with the method for density and water absorption coefficient of coarse aggregate specified in JIS A 5209:

$$\text{Water absorption (\%)} = \frac{W_2 - W_1}{W_1} \times 100 \quad (1)$$

wherein $W_1$ represents the mass of a sample in an absolutely dry condition and $W_2$ represents the mass of the sample in a surface-dried condition.

The permeability coefficient is a value at 20° C. obtained from following equation (2) in accordance with the method for permeability of soil specified in JIS A 1218:

$$\text{Permeability coefficient (cm/s)} = \frac{L}{h} \times \frac{Q}{A(t_2 - t_1)} \quad (2)$$

wherein A represents the cross section (cm²) of a test piece; L, the height (cm) of the test piece; h, the water level (cm); $t_2-t_1$, water permeation time (s); and Q, quantity (cm³) of water discharged from a drain.

Preferably, the fired spinel complex oxide has a mean grain size in the range of 0.5 to 25 mm and an apparent specific gravity in the range of 1.4 to 1.8 g/cm³, preferably 1.5 to 1.7 g/cm³. Such a fired spinel complex oxide can be advantageously used as artificial aggregate and other materials.

The apparent specific gravity is obtained from following equation (3) in accordance with the method for unit weight of aggregate specified in JIS A 1104:

$$\text{Apparent specific gravity (g/cm}^3\text{)} = \frac{\text{Weight of test piece in vessel (g)}}{\text{Vessel volume (cm}^3\text{)}} \quad (3)$$

A method for preparing the fired spinel complex oxide will now be described.

The method includes the following three steps:

the first step of blending a slag by-produced in a chromium refining process, a reducer, a material containing silica, and water to prepare a mixture comprising particles having a mean grain size of 100 μm or less, the slag being essentially composed of 39 to 44 percent by weight of $Fe_2O_3$, 13 to 19 percent by weight of $Al_2O_3$, 10 to 14 percent by weight of MgO, 0 to 4 percent by weight of $Na_2O$, 13 to 20 percent by weight of $Cr_2O_3$, 2 percent by weight or less of CaO;

the second step of granulating or pressing the mixture to prepare a reaction precursor; and the third step of firing the precursor at a temperature of 950° C. or more and subsequently cooling the fired product to yield the fired spinel complex oxide.

The by-product slag, a first raw material, is a large amount of residue remaining after extraction of sodium chromate by immersing an oxidized and roasted mixture of chrome ore and an alkali in water. It is important that the slag is essentially composed of 39 to 44 percent by weight, and preferably 41 to 44 percent by weight of $Fe_2O_3$; 13 to 19 percent by weight, and preferably 15 to 19 percent by weight of $Al_2O_3$; 10 to 14 percent by weight, and preferably 11 to 14 percent by weight of MgO; 0 to 4 percent by weight, and preferably 0 to 3 percent by weight of $Na_2O$; 13 to 20 percent by weight, and preferably 13 to 17 percent by weight of $Cr_2O_3$; and 2 percent by weight or less, and preferably 1 percent by weight or less of CaO. Preferably, the slag does not substantially contain CaO.

In particular, it is preferable that the alkali mixed with chrome ore be a sodium compound, such as sodium hydroxide or soda ash, but not calcium salt, such as calcium hydroxide, and that the extraction of sodium chromate be performed according to following equation (4):

$$2(FeO \cdot Cr_2O_3) + 8NaOH + 2/7O_2 \rightarrow 4Na_2CrO_4 + 4H_2O + Fe_2O_3 \quad (4)$$

Such preparation of the slag does not require complicated purification, such as for reducing the CaO content in the slag. Preferably, the chrome ore is essentially composed of 25 to 34 percent by weight of $Fe_2O_3$, 13 to 20 percent by weight of $Al_2O_3$, 7 to 11 percent by weight of MgO, 44 to 48 percent by weight of $Cr_2O_3$, and 2 percent by weight or less of CaO. Such a chrome ore can provide sodium chromate with a high yield, using only a sodium compound as the alkaline source, but not a calcium compound, such as calcium hydroxide. Also, the resulting residue of the sodium chromate extraction contains 2 percent by weight or less, and preferably 1 percent by weight or less of CaO and can be used as it is without adjusting the composition. One example of such chrome ores is produced in South Africa.

The reducer, a second raw material, contains at least 85 percent by weight, and preferably at least 88 percent by weight of reducing carbon, and is important in reducing the hexavalent chromium in the slag to trivalent chromium. Any type of reducer may be used without limitation as long as it can reduce insoluble chromium in the slag. For example, practical reducers include by-products in or wastes from various industrial fields, such as heavy oil, waste acid pitch, tar pitch, asphalt, various types of synthetic resin powder, coke, coal, humic acid, lignin sulfonates from spent liquor, sawdust, blackstrap molasses, starch, cellulose, and straw chips, and products of thermal decomposition of these materials. These reducers may be used singly or in combination.

Relative to 100 parts by weight of the slag, 4 to 13 parts by weight, and preferably 7 to 11 parts by weight of the reducer is added in terms of carbon. A reducer content outside these ranges is not practical because a reducer content of less than 4 parts by weight in terms of carbon is liable to make the reduction of the hexavalent chromium insufficient, and a reducer content of more than 13 parts by weight is liable to cause unreacted reducer to remain.

The silica-containing material, a third raw material, contains at least 60 percent by weight, and preferably at least 63 percent by weight of $SiO_2$, and immobilizes the alkaline components to prevent $Cr^{+3}$ from being restored to $Cr^{+6}$. The silica-containing material also gives an adequate strength to the resulting fired spinel complex oxide. Usable silica-containing materials include silica sand, amorphous silica, clay, perlite, shale, siliceous sinter, pumice, spoil, sandstone, Shirasu (white arenaceous sediment), ganister, fly ash, byerite cinder, burned brimstone residue, various types of silica-containing slag by-produced in electric furnaces, blast furnaces, and so forth in manufacture of iron and steel, yellow phosphorus, and alloys, and industrial waste, such as black sand discharged from foundries. These materials may be used singly or in combination. Among others preferred is a clay mineral exhibiting a strong viscosity in the presence of water. Such a clay mineral increases the contact areas of the raw materials and, thus, helps efficiently prepare a reaction precursor described later.

Relative to 100 parts by weight of the slag, 15 to 21 parts by weight, and preferably 17 to 20 parts by weight of the silica-containing material is added in terms of $SiO_2$. A silica-containing material content of less than 15 parts by weight degrades the strength of the resulting fired spinel complex oxide and the capability of immobilizing the alkaline components, and is accordingly liable to cause restoration of $Cr^{+3}$ to $Cr^{+6}$. On the other hand, a silica-containing material content of more than 21 parts by weight allows the reaction to proceed, but causes unreacted raw materials to remain, thereby disadvantageously preventing the production of only a spinel phase.

The water, a forth raw material, is necessary for producing granulated materials or pressure-formed materials having effectively increased contact areas. Generally used industrial water may be used as the water. Alternatively, sludge liquor by-produced in electric furnaces or blast furnaces in manufacture of various types of alloy may be used.

Relative to 100 parts by weight of the slag, 11 to 17 parts by weight, and preferably 11 to 15 parts by weight of water is added. Such water content advantageously allows the raw materials to adhere tightly to each other to form a granulated or pressure-formed material having effectively increased contact areas.

In the first step, the first to third raw materials and the fourth material or water are blended to prepare a mixture containing particles having a mean grain size of 100 $\mu$m or less, and preferably in the range of 20 to 50 $\mu$m. If an aqueous solution or a slurry is used as the reducer, the water of the reducer may be used as the fourth raw material water.

The particles in the mixture are insoluble in water, and maintain a specific form even in the presence of water. The reason why the mean grain size of the particles is set in the above-mentioned ranges is that a mean grain size of more than 100 $\mu$m does not result in a reactive reaction precursor described later even by granulation or pressure forming. Consequently, the alkaline components and chromium are not completely immobilized to stabilize in the spinel phase, and thus a spinel single phase does not occur which exhibits a diffraction peak in the vicinity of $2\theta=26.7°$ and other peaks. Thus, the alkaline components and the chromium easily leach under harsh conditions as pulverized or placed in a high-temperature environment or in acid or alkali.

Preferably, the above-described first to third raw materials are of powder, but the second raw material or reducer may be of solution or slurry. Therefore, if the first to third raw materials are of powder or if the first and third raw materials are of powder and the second raw material is of slurry and insoluble in water, the mean grain size of the mixture of the raw materials refers to the mean grain size of the particles of the first to third raw materials. If the first and third raw materials are of powder, the second raw material is of solution, and the third raw material is insoluble in water, the mean grain size of the mixture refers to the mean grain size of the particles of the first and third raw materials.

Preferably, the second to forth raw materials each have a low CaO content as well as the CaO content in the first raw material or slag by-produced in chromium refining. It is particularly preferable that the CaO content in the mixture of the particles is 2 percent by weight or less, and preferably 1 percent by weight, from the viewpoint of preventing by-production of calcium chromate and providing such recyclability and safety that hexavalent chromium derived from the calcium chromate does not leach even under harsh conditions as pulverized or placed in a high-temperature environment or in acid or alkali.

The first step of the process of the present invention is performed in any manner, as long as the mixture contains particles having a mean grain size in the foregoing range and in which the raw materials are uniformly dispersed. For example, the first step is performed in such a manner that:

(1) Predetermined amounts of powders of the first to third raw materials pulverized in advance are blended to prepare a mixture having a mean grain size in the foregoing range, and the fourth raw material or water is added to the mixture so that the raw materials are uniformly dispersed;

(2) Predetermined amounts of powders of the first to third raw materials are blended, the mixture is pulverized to a mean grain size in the foregoing range, and the fourth raw material or water is added to the mixture so that the raw materials are uniformly dispersed;

(3) Predetermined amounts of powders of the first and third raw materials pulverized in advance are blended to prepare a mixture having a mean grain size in the foregoing range, and a solution of the second raw material and optionally water in an amount equivalent to the shortfall are added to the mixture so that the raw materials are uniformly dispersed; or (4) Predetermined amounts of powders of the first and third raw materials are blended, pulverized the mixture to a mean grains size in the foregoing range, and a solution of the second raw material and optionally water in an amount equivalent to the shortfall are added to the mixture so that the raw materials are uniformly dispersed.

Preferably, the pulverization in the above-described methods (1) to (4) is performed in a dry manner because the raw materials exhibit viscosity in an aqueous medium. Usable dry pulverizing apparatuses include, but not particularly limited to, bead mills and jet mills.

For uniformly dispersing the raw materials, mechanical means having a large shearing force is used. Usable mixing apparatuses include high-speed mixers, super mixers, turbosphere mixers, Henschel mixers, Nauta mixers, ribbon blenders, and paddle mixers. The operation for uniform dispersion is not limited to the use of the mechanical means above.

In the second step, the resulting mixture of particles is granulated or pressed to prepare a reaction precursor.

The reaction precursor has been given reactivity by bringing the distance between the particles of the raw materials close to one another to increase the contact areas between the raw materials, prior to firing the mixture of the first to third raw materials, that is, the slag, the reducer, and the silica-containing material, in the presence of an aqueous medium.

The granulated material has a mean grain size preferably in the range of 0.5 to 25 mm, and more preferably 5 to 20 mm, from the viewpoint of preventing fracture of the grains during drying and firing. Small grains of the granulated material have poor reactivity and can deposit onto the firing furnace to damage it. It is therefore preferable that the content of grains having a grain size of 5 mm or less in the granulated material be 25 percent by weight or less, and more preferably 15 percent by weight or less.

In order to granulating the mixture efficiently in the second step, the product fired spinel complex oxide which has been prepared in advance may be uniformly dispersed in the particles of the mixture prepared in the first step to serve as the nucleus of the granulation. In this instance, it is preferable that a fired spinel complex oxide having a grain size of 5 mm or less, more preferably in the range of 0.3 to 3 mm, be added in an amount of 18 to 35 percent by weight, and more preferably 20 to 22 percent by weight relative to the slag or first raw material.

The granulation may be performed in a pan-type granulator, a plate-type granulator, or an extruder, but the equipment is not limited to these.

In the other method of pressing the mixture, the mixture of the particles prepared in the first step is pressed into a form to increase the contact area of the raw materials.

In this instance, the forming pressure is generally in the range of 5 to 200 MPa, and preferably 10 to 150 MPa, but it depends on the type of pressing machine and the amount of materials without particular limitation. The pressuring machine may be a tableting machine, briquette machine, or a roller compactor, but it is not particularly limited to these as long as being capable of pressing.

Preferably, the reaction precursor is prepared by granulation because granulation increases productivity more than pressure forming.

If the granulated material or pressure-formed material contains more than 15 percent by weight of water, preferably, the material is dried at a temperature in the range of 30 to 350° C., preferably 50 to 200° C., to reduce the water content to 15 percent by weight or less before the third step. This is because a granulated or pressure-formed material containing a large amount of water is likely to be broken by firing in the subsequent third step.

In the third step, the reaction precursor is fired and subsequently cooled to yield the targeted fired spinel complex oxide.

The firing temperature is, preferably, at least 950° C., and more preferably at least 1,000° C. in order to reduce the hexavalent chromium sufficiently. A firing temperature of less than 950° C. does not sufficiently reduce the hexavalent chromium to trivalent chromium nor sufficiently promote the reaction between the alkaline components in the slag and the silica-containing material. Consequently, the resulting fired complex oxide does not show a Cu—Kα X-ray diffraction pattern in which the ratio (b/a) of the peak intensity of the silica-containing material (b) in the vicinity of $2\theta=26.7°$ to the {113} plane peak intensity (a) in the vicinity of $2\theta=36°$ is 0.1 or less. On the other hand, a firing temperature of more than 1200° C. makes it difficult to prepare a reducing atmosphere, and accordingly the reduction can be insufficient. It is therefore preferable that the firing is performed at a temperature in the range of 1,000 to 1,200° C.

The firing is performed taking plenty of time until the diffraction peak in the vicinity of $2\theta=26.7°$ based on the silica-containing material in the fired spinel complex oxide disappears. The firing time is generally 0.2 hour or more, and preferably in the range of 0.25 to 1 hour.

Usable firing furnaces include, but not limited to, tunnel furnaces, roller-hearth furnaces, rotary kilns, and muffle furnaces.

Since the reaction precursor contains some amount of water, rapid increase in firing temperature is likely to cause the fracture of grains of the granulated material. The small grains resulting from this fracture have so poor a reactivity as to make the reduction insufficient, and can be deposited onto the firing furnace to damage it, as described above. It is therefore preferable that the reaction precursor be placed in the firing furnace of 400° C. or less.

After firing, the material is cooled as appropriate and, optionally, the gain size is adjusted. Thus, the targeted fired spinel complex oxide is obtained.

Since an oxidizing atmosphere at a temperature of 200° C. or more easily allows trivalent chromium to oxidize to hexavalent chromium, the cooling in the third step is continued in a reducing atmosphere until temperature is reduced to 200° C. or less. In order to avoid bringing the product into contact with air during cooling, it is, in general, preferable that the product be allowed to stand in a reducing atmosphere or the external walls of the firing furnace be cooled with a cooling medium, such as water, until the temperature is reduced to 200° C. or less, and that, then, the product be brought into contact with water to reduce the temperature to room temperature.

The resulting fired spinel complex oxide is essentially composed of 29 to 40 percent by weight, and preferably 30 to 33 percent by weight of $Fe_2O_3$; 15 to 20 percent by weight, and preferably 16 to 19 percent by weight of $Al_2O_3$; 9 to 14 percent by weight, and preferably 9 to 11 percent by weight of MgO; 0 to 4 percent by weight, and preferably 2 percent by weight or less of $Na_2O$; 9 to 17 percent by weight, and preferably 12 to 15 percent by weight of $Cr_2O_3$; 14 to 20 percent by weight, and preferably 15 to 18 percent by weight of $SiO_2$, and 2 percent by weight or less, and preferably 1 percent by weight or less of CaO. The fired product also shows a Cu—Kα X-ray diffraction pattern in which the ratio (b/a) of the diffraction peak intensity of the silica-containing material (b) in the vicinity of $2\theta=26.7°$ to the {113} plane diffraction peak intensity (a) in the vicinity of $2\theta=36°$ is 0.1 or less, and preferably 0.05 or less.

Since the fired spinel complex oxide of the present invention has the above-described characteristic features, alkali or chromium ions do not leach from the fired complex oxide even if it is allowed to stand in water for a long time, and the pH of the water is maintained almost neutral. In addition, the fired spinel complex oxide has a heat resistance of 400° C. or more and chemical resistance to acids and alkalis, and can be pulverized into particles of 10 μm or less in grain size. The fired spinel complex oxide has such recyclability and safety as not to allow chromium and alkaline components to leach even under harsh conditions as above. Since the fired spinel complex oxide of the present invention does not allow chromium or alkaline components to leach even under harsh conditions, it can be safely disposed of without harmful effects, and does not deteriorate during handling or storage. Also, the chromium or alkaline components do not leach from the fired product during or after use. Furthermore, the fired product has superior water retentivity and well-drained characteristics in view of recycling. Accordingly, it can be advantageously used as artificial aggregate, such as sand for mortar, lightweight aggregate, aggregate for roads, and materials for landfill of building land and seaside, and various materials for structural engineering and their raw materials.

Examples

The present invention will now be further described in detail using examples, but the invention is not limited to these examples.

Preparation of Slag

Powder Slag A:

Into 100 g of chrome ore (produced in South Africa) having the composition shown in Table 1 was added 72.9 g of 98% soda ash. The mixture was roasted at 1,000° C. in an electric furnace for 0.5 hour. After cooling the roasted product, chromium slag was extracted with water.

With 100 parts by weight of the chrome ore was blended 160 parts by weight of the resulting chromium slag. Then, extraction was repeated by adding the soda ash in the same manner as above. Thus, powder slag A having the composition shown in Table 2 was prepared.

According to a sieve analysis, the mean grain size of powder slag A was 0.1 mm.

TABLE 1

Chrome ore composition (wt %)

| $Cr_2O_3$ | FeO | $Al_2O_3$ | MgO | $SiO_2$ | CaO | Cr/Fe ratio |
|---|---|---|---|---|---|---|
| 46.12 | 26.69 | 17.20 | 9.17 | 0.57 | 0.22 | 1.52 |

TABLE 2

Powder slag A composition (wt %)

| $Cr_2O_3$ | FeO | $Al_2O_3$ | MgO | $SiO_2$ | CaO | $Na_2O$ |
|---|---|---|---|---|---|---|
| 14.83 | 42.51 | 16.50 | 12.85 | 1.03 | 0.69 | 2.65 |

Powder Slag B:

Into 100 parts by weight of chrome ore (produced in India) having the composition shown in Table 3 was added 68 parts by weight of 98% soda ash and 60 parts by weight of calcium hydroxide. The mixture was roasted at 1,000° C. in an electric furnace for 0.5 hour. After cooling the roasted product, chromium slag was extracted with water.

With 100 parts by weight of the chrome ore was blended 170 parts by weight of the resulting chromium slag. Then, extraction was repeated by adding the soda ash and calcium hydroxide in the same manner as above. Thus, powder slag B having the composition shown in Table 4 was prepared.

According to a sieve analysis, the mean grain size of powder slag B was 2 mm.

TABLE 3

Chrome ore composition (wt %)

| $Cr_2O_3$ | FeO | $Al_2O_3$ | MgO | $SiO_2$ | CaO | Cr/Fe ratio |
|---|---|---|---|---|---|---|
| 54.96 | 14.92 | 11.89 | 12.32 | 3.04 | 0.36 | 3.24 |

TABLE 4

Powder slag B composition (wt %)

| $Cr_2O_3$ | FeO | $Al_2O_3$ | MgO | $SiO_2$ | CaO | $Na_2O$ |
|---|---|---|---|---|---|---|
| 7.78 | 14.89 | 9.86 | 13.33 | 2.75 | 34.12 | 2.00 |

Reducer:

An oil coke having the composition shown in Table 5 was used as the reducer, and the mean grain size of the reducer was 6 mm, according to a sieve analysis.

TABLE 5

Coke composition (wt %)

| Carbon | Sulfur | Volatiles | Ash |
|---|---|---|---|
| 89.1 | 1.3 | 11.1 | 0.4 |

Silica-containing Material:

A clay (Kasaoka Nendo) having a mean grain size of 10 μm, which was obtained by laser diffraction, and having the composition shown in Table 6 was used as the silica-containing material.

TABLE 6

Clay composition (wt %)

| $SiO_2$ | $Al_2O_3$ | CaO | MgO | $Na_2O$ | Ignition loss |
|---|---|---|---|---|---|
| 64.92 | 17.32 | 1.15 | 1.80 | 0.60 | 4.76 |

Example 1

First Step:

Blended were 100 parts by weight of powder slag A, 30 parts by weight of the clay, and 10 parts by weight of the coke with a ball mill using steel balls of 20 mm in diameter. The resulting mixture had a mean grain size of about 20 μm, according to laser diffraction.

Then, 20 parts by weight of water was added to 100 parts by weight of the mixture and blended sufficiently with a paddle mixer for 0.5 so that the raw materials were uniformly dispersed. The CaO content in this mixture was 0.7 percent by weight.

Second Step:

The resulting mixture was subjected to granulation to prepare a granulated material with a plate-type granulator at a tilt angle of 50° at a rotation speed of 10 rpm.

The granulated material was dried at 100° C. for 2 hours to prepare a reaction precursor comprising spherical grains having the physical properties shown in Table 7.

The grain size was measured in accordance with the method for sieve analysis of aggregate specified in JIS A 1102.

TABLE 7

| | Property |
|---|---|
| Mean grain size (mm) | 15 |
| Content of grains of 0.5 mm or less in grain size (wt %) | 5 |
| Water content (wt %) | 14 |

Third Step:

The reaction precursor in an amount of 100 parts by weight was placed in an electric furnace of 25° C. and fired at 1,000° C. for 0.5 hour. Then, the fired product was naturally cooled to 25° C. with a reducing atmosphere maintained, and thus 89 parts by weight of a fired spinel complex oxide was yielded.

According to the sieve analysis of aggregate, the resulting fired spinel complex oxide had a mean grain size of 14 mm and contains 5 percent by weight of grains having a grain size of 0.5 mm or less.

The fired spinel complex oxide had physical properties shown in Tables 11 and 12.

Example 2

First Step:

Blended were 100 parts by weight of powder slag A, 30 parts by weight of the clay, and 8 parts by weight of the coke with a ball mill using steel balls of 20 mm in diameter. The resulting mixture had a mean grain size of about 20 μm, according to laser diffraction.

Then, 5 parts by weight of the fired spinel complex oxide prepared in Example 1, having a grain size of 1 mm or less and 20 parts by weight of water were added to 100 parts by weight of the mixture and blended sufficiently with a paddle mixer for 0.5 hour so that the raw materials were uniformly dispersed. The CaO content in this mixture was 0.7 percent by weight.

Second Step:

The resulting mixture was subjected to granulation to prepare a granulated material with a plate-type granulator at a tilt angle of 500 at a rotation speed of 10 rpm.

The granulated material was dried at 100° C. for 2 hours to prepare a reaction precursor comprising spherical grains having the physical properties shown in Table 8.

The grain size was measured in accordance with the method for sieve analysis of aggregate specified in JIS A 1102.

TABLE 8

| | Property |
|---|---|
| Mean grain size (mm) | 15 |
| Content of grains of 0.5 mm or less in grain size (wt %) | 5 |
| Water content (wt %) | 14 |

Third Step:

The reaction precursor was placed in an electric furnace of 25° C. and fired at 1,000° C. for 0.5 hour. Then, the fired product was naturally cooled to 25° C. with a reducing atmosphere maintained, and thus 90 parts by weight of a fired spinel complex oxide was yielded. According to the sieve analysis of aggregate, the resulting fired spinel complex oxide had a mean grain size of 15 mm and contains 3 percent by weight of grains having a grain size of 1 mm or less.

The fired spinel complex oxide had physical properties shown in Tables 11 and 12.

Example 3

A fired spinel complex oxide was prepared in the same manner as in Example 2 except that in the first step, water was replaced with a sludge liquor having the composition shown in Table 9 prepared by solid-liquid separation of a sludge produced in purification of an extracted liquid.

According to the sieve analysis of aggregate, the resulting fired spinel complex oxide had a mean grain size of 16 mm and contains 6 percent by weight of grains having a grain size of 0.5 mm or less.

The fired spinel complex oxide had physical properties shown in Tables 11 and 12.

TABLE 9

| Sludge liquor composition (wt %) | | |
|---|---|---|
| $Na_2CrO_4$ | $Al(OH)_3$ | $H_2O$ |
| 2.1 | 30.2 | 67.7 |

Comparative Example 1

A fired spinel complex oxide was prepared in the same manner as in Example 1 except that the mixture in which the raw materials were uniformly dispersed was pulverized into particles having a mean grain size of 180 μm in the first step.

According to the sieve analysis of aggregate, the resulting fired spinel complex oxide had a mean grain size of 10 mm and contains 23 percent by weight of grains having a grain size of 0.5 mm or less.

The fired spinel complex oxide had physical properties shown in Tables 11 and 12.

Comparative Example 2

A mixture in which the raw materials were uniformly dispersed was prepared in the first step performed in the same manner as in Example 1. The mixture in an amount of 100 parts by weight was placed in an electric furnace of 25° C. as it was, and fired at 1,000° C. for 0.5 hour. Then, the fired product was naturally cooled to 25° C. with a reducing atmosphere maintained, and thus 90 parts by weight of a fired spinel complex oxide was yielded. Then, the fired product was crushed. According to the sieve analysis of aggregate, the resulting fired spinel complex oxide had a mean grain size of 2 mm and contains 20 percent by weight of grains having a grain size of 0.5 mm or less.

The fired spinel complex oxide had physical properties shown in Tables 11 and 12.

Comparative Example 3

First Step:

Blended were 100 parts by weight of powder slag B, 30 parts by weight of the clay, and 10 parts by weight of the coke with a ball mill using steel balls of 20 mm in diameter. The resulting mixture had a mean grain size of 22 μm, according to the sieve analysis of aggregate.

Then, 20 parts by weight of water was added to 100 parts by weight of the mixture and blended sufficiently with a paddle mixer for 0.5 hour so that the raw materials were uniformly dispersed. The CaO content in this mixture was 25.1 percent by weight.

Second Step:

The resulting mixture was subjected to granulation to prepare a granulated material with a plate-type granulator at a tilt angle of 500 at a rotation speed of 10 rpm.

The granulated material was dried at 100° C. for 2 hours to prepare a reaction precursor comprising spherical grains having the physical properties shown in Table 10.

The grain size was measured in accordance with the test method for sieve analysis of aggregate specified in JIS A 1102.

TABLE 10

|  | Property |
|---|---|
| Mean grain size (mm) | 16 |
| Content of grains of 0.5 mm or less in grain size (wt %) | 4 |
| Water content (wt %) | 14 |

Third Step:

The reaction precursor in an amount of 100 parts by weight was placed in an electric furnace of 25° C. and fired at 1,000° C. for 0.5 hour. Then, the fired product was naturally cooled to 25° C. with a reducing atmosphere maintained, and thus 88 parts by weight of a fired spinel complex oxide was yielded.

According to the sieve analysis of aggregate, the resulting fired spinel complex oxide had a mean grain size of 14 mm and contains 2 percent by weight of grains having a grain size of 0.5 mm or less.

The fired spinel complex oxide had physical properties shown in Tables 11 and 12.

Evaluation of Fired Spinel Complex Oxides

Composition:

The samples of the fired spinel complex oxide prepared in Examples 1 to 3 and Comparative Examples 1 to 3 were subjected to inductively coupled plasma (ICP) spectrometry to analyze the composition, and the results are shown in Table 11.

Grain Size:

The grain size of each sample was measured in accordance with the method for sieve analysis of aggregate specified in JIS A 1102, and the results are shown in Table 12.

X-ray Diffraction Analysis:

Each sample was subjected to X-ray diffraction analysis with a radiation source of Cu—Kα to obtain the ratio (b/a) of the diffraction peak intensity of the silica-containing material (b) in the vicinity of $2\theta=26.7°$ to the {113} plane diffraction peak intensity (a) in the vicinity of $2\theta=36°$. The results are shown in Table 12.

Figure 2:
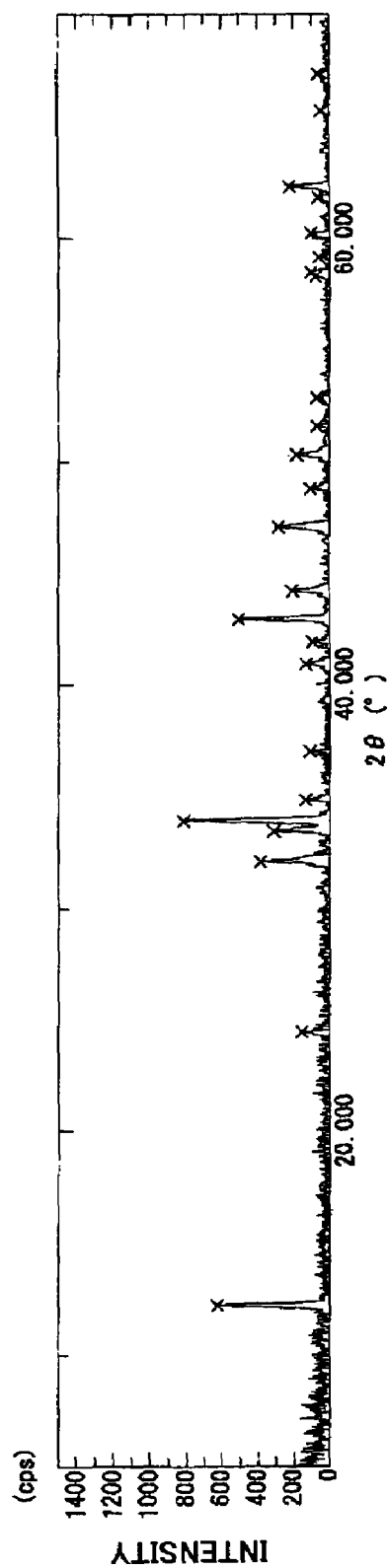
FIG. 2 is an X-ray diffraction pattern of a fired spinel complex oxide prepared in Comparative Example 3.

FIGS. 1 and 2 show X-ray diffraction patterns of samples prepared in Example 1 and Comparative Example 3, respectively.

Water Absorption and Permeability Coefficient:

The water absorption of each sample was evaluated in accordance with the method for density and water absorption of coarse aggregate specified in JIS A 5209, and the permeability coefficient was evaluated in accordance with the method for permeability of soil specified in JIS A 1218. The results are shown in Table 12.

Uniaxial Compressive Strength:

Five grains extracted from each of the samples were each subjected to measurement for uniaxial compressive strength in accordance with JIS A 5002. The results were averaged and shown in Table 12.

Apparent Specific Gravity:

The apparent specific gravity of each sample was measured in accordance with JIS A 1104, and the results are shown in Table 12.

TABLE 11

|  | Example | | | Comparative example | | |
|---|---|---|---|---|---|---|
|  | 1 | 2 | 3 | 1 | 2 | 3 |
| $Fe_2O_3$ (wt %) | 37.6 | 38.1 | 37.8 | 37.5 | 37.2 | 14.3 |
| $Al_2O_3$ (wt %) | 18.5 | 17.8 | 18.2 | 18.3 | 18.0 | 12.7 |
| MgO (wt %) | 11.4 | 12.0 | 11.7 | 11.2 | 11.1 | 11.8 |
| $Na_2O$ (wt %) | 2.4 | 2.2 | 2.4 | 2.5 | 2.4 | 1.8 |
| $Cr_2O_3$ (wt %) | 12.7 | 13.0 | 12.8 | 12.9 | 12.8 | 6.8 |
| $SiO_2$ (wt %) | 18.1 | 17.5 | 18.2 | 18.3 | 18.2 | 19.5 |
| CaO (wt %) | 0.7 | 0.7 | 0.6 | 0.7 | 0.7 | 29.8 |
| Feature in X-ray diffraction | Spinel single phase | Spinel single phase | Spinel single phase | Mixed phase | Mixed phase | Mixed phase |

(Note)
The mixed phase essentially contains the silica-containing material and a spinel comprising Mg, Al, Cr, and Fe.

TABLE 12

|  | Example | | | Comparative example | | |
|---|---|---|---|---|---|---|
|  | 1 | 2 | 3 | 1 | 2 | 3 |
| Mean grain size (mm) | 14 | 15 | 16 | 10 | 2 | 14 |
| Content of grains of 0.5 mm or less in grain size (wt %) | 5 | 3 | 6 | 23 | 20 | 2 |
| Uniaxial compressive strength (PMa) | 3 | 2 | 3 | 1 | — | 2 |
| Water absorption (%) | 19 | 18 | 19 | 16 | 15 | 12 |
| Permeability (cm/s) | $4 \times 10^{-3}$ | $3 \times 10^{-3}$ | $4 \times 10^{-3}$ | $5 \times 10^{-3}$ | $1 \times 10^{-3}$ | $4 \times 10^{-3}$ |
| Apparent specific gravity (g/cm$^3$) | 1.7 | 1.6 | 1.7 | 1.9 | 1.5 | 1.3 |
| b/a ratio | 0.0 | 0.0 | 0.0 | 0.2 | 0.5 | 0.2 |

Chromium Leaching Test

Leaching Test 1:

In a polyethylene vessel were compounded 50 g of a sample of the fired spinel complex oxide prepared in Examples 1 to 3 and 450 mL of water, and the mixture was shaken to leach chromium at 20° C. for 6 hours. The amount of leached chromium and the pH of the solution were measured. The results are shown in Table 13.

Leaching Test 2:

In a glass beaker were compounded 50 g of a sample of the fired spinel complex oxide prepared in Examples 1 to 3 and 450 mL of water, and the mixture was exposed to ultraviolet light. The results are shown in Table 14.

Leaching Test 3:

Each of the samples prepared in Examples 1 to 3 in an amount of 50 g was pulverized into grains having a mean grain size of 2 mm. Compounded were 50 g of the pulverized sample and 450 mL of water. The pH of the mixture was adjusted using hydrochloric acid, sulfuric acid, nitric acid, and a carboxylic acid as acid, and sodium hydroxide and ammonia water as alkali. The mixture was allowed to stand separately at 20° C. and 80° C. for 6 hours and filtered. The amount of leached chromium in and the pH of the filtrate were measured. The results are shown in Tables 15 and 16.

Leaching Test 4:

Each of the samples prepared in Examples 1 to 3 in an amount of 50 g was pulverized into grains having a mean grain size of 2 mm. The pulverized sample was heated at 80° C., 120° C., 200° C., 300° C., and 400° C. separately, followed by cooling. In a polyethylene vessel were compounded 50 g of the sample and 450 mL of water, and the mixture was shaken to leach chromium at 20° C. for 6 hours. The amount of the leached chromium and the pH of the solution were measured. The results are shown in Table 17.

Leaching Test 5:

Each of the samples prepared in Examples 1 to 3 was pulverized with a vibration mill to prepare samples having different grain sizes. In a glass beaker were compounded 50 g of a pulverized sample and 450 mL of water. The mixture was allowed to stand at 20° C. for 6 hours, and then filtered. The amount of leached chromium in and the pH of the filtrate were measured. The results are shown in Table 18.

TABLE 13

| | Leaching Test 1 | | | | | |
|---|---|---|---|---|---|---|
| | Example 1 | | Example 2 | | Example 3 | |
| | Leached Cr(ppm) | pH | Leached Cr(ppm) | pH | Leached Cr(ppm) | pH |
| After 0 hours | N.D. | 9.0 | N.D. | 9.1 | N.D. | 9.0 |
| After 1 year | N.D. | 9.1 | N.D. | 9.2 | N.D. | 9.2 |
| After 2 years | N.D. | 9.2 | N.D. | 9.0 | N.D. | 9.1 |
| After 3 years | N.D. | 9.1 | N.D. | 9.1 | N.D. | 9.1 |

(Note)
N.D. in Table 13 represents a value of detection limit 0.02 ppm or less.

TABLE 14

| | Leaching Test 2 | | | | | |
|---|---|---|---|---|---|---|
| | Example 1 | | Example 2 | | Example 3 | |
| | Leached Cr(ppm) | pH | Leached Cr(ppm) | pH | Leached Cr(ppm) | pH |
| After 150 hours | N.D. | 9.2 | N.D. | 9.1 | N.D. | 9.1 |
| After 300 hours | N.D. | 9.1 | N.D. | 9.2 | N.D. | 9.1 |
| After 600 hours | N.D. | 9.2 | N.D. | 9.2 | N.D. | 9.0 |
| After 1200 hours | N.D. | 9.2 | N.D. | 9.2 | N.D. | 9.2 |

(Note)
N.D. in Table 14 represents a value of detection limit 0.02 ppm or less.

TABLE 15

Leaching Test 3 (20° C.)

| | Example 1 | | Example 2 | | Example 3 | | Blank test | |
|---|---|---|---|---|---|---|---|---|
| | Leached Cr(ppm) | pH | Leached Cr(ppm) | pH | Leached Cr(ppm) | pH | Leached Cr(ppm) | pH |
| pH = 2 | | | | | | | | |
| HCl | N.D. | 4.0 | N.D. | 4.1 | N.D. | 4.0 | N.D. | 2.1 |
| H$_2$SO$_4$ | N.D. | 4.2 | N.D. | 4.1 | N.D. | 4.1 | N.D. | 2.1 |
| HNO$_3$ | N.D. | 4.2 | N.D. | 4.2 | N.D. | 3.9 | N.D. | 2.0 |
| CH$_3$COOH | N.D. | 4.1 | N.D. | 4.2 | N.D. | 4.0 | N.D. | 2.0 |
| pH = 4 | | | | | | | | |
| HCl | N.D. | 5.6 | N.D. | 5.6 | N.D. | 5.5 | N.D. | 3.8 |
| H$_2$SO$_4$ | N.D. | 5.9 | N.D. | 5.5 | N.D. | 5.6 | N.D. | 4.1 |
| HNO$_3$ | N.D. | 5.5 | N.D. | 5.7 | N.D. | 5.6 | N.D. | 3.9 |
| CH$_3$COOH | N.D. | 5.6 | N.D. | 5.6 | N.D. | 5.7 | N.D. | 3.9 |
| pH = 8 | | | | | | | | |
| NaOH | N.D. | 8.7 | N.D. | 8.9 | N.D. | 8.9 | N.D. | 7.8 |
| NH$_4$OH | N.D. | 8.8 | N.D. | 8.9 | N.D. | 8.7 | N.D. | 8.0 |
| pH = 10 | | | | | | | | |
| NaOH | N.D. | 9.2 | N.D. | 9.2 | N.D. | 9.2 | N.D. | 9.8 |
| NH$_4$OH | N.D. | 9.3 | N.D. | 9.2 | N.D. | 9.4 | N.D. | 10 |
| pH = 12 | | | | | | | | |
| NaOH | N.D. | 9.9 | N.D. | 9.8 | N.D. | 9.8 | N.D. | 11.9 |
| NH$_4$OH | N.D. | 10 | N.D. | 10.1 | N.D. | 9.9 | N.D. | 12.1 |

(Note)
N.D. in Table 15 represents a value of detection limit 0.02 ppm or less.

TABLE 16

Leaching Test 3 (80° C.)

| | Example 1 | | Example 2 | | Example 3 | | Blank test | |
|---|---|---|---|---|---|---|---|---|
| | Leached Cr (ppm) | pH | Leached Cr (ppm) | pH | Leached Cr (ppm) | pH | Leached Cr (ppm) | pH |
| pH = 2 | | | | | | | | |
| HCl | N.D. | 4.2 | N.D. | 4.1 | N.D. | 4.3 | N.D. | 2.2 |
| H$_2$SO$_4$ | N.D. | 4.1 | N.D. | 4.2 | N.D. | 4.1 | N.D. | 2.1 |
| HNO$_3$ | N.D. | 4.2 | N.D. | 4.2 | N.D. | 4.2 | N.D. | 2.0 |
| CH$_3$COOH | N.D. | 4.2 | N.D. | 4.2 | N.D. | 4.1 | N.D. | 2.1 |
| pH = 4 | | | | | | | | |
| HCl | N.D. | 5.8 | N.D. | 5.7 | N.D. | 5.7 | N.D. | 3.9 |
| H$_2$SO$_4$ | N.D. | 5.9 | N.D. | 5.6 | N.D. | 5.7 | N.D. | 4.1 |
| HNO$_3$ | N.D. | 5.7 | N.D. | 5.8 | N.D. | 5.8 | N.D. | 4.1 |
| CH$_3$COOH | N.D. | 5.7 | N.D. | 5.8 | N.D. | 5.8 | N.D. | 4.2 |
| pH = 8 | | | | | | | | |
| NaOH | N.D. | 8.8 | N.D. | 8.9 | N.D. | 8.8 | N.D. | 7.8 |
| NH$_4$OH | N.D. | 8.7 | N.D. | 8.7 | N.D. | 8.6 | N.D. | 7.8 |
| pH = 10 | | | | | | | | |
| NaOH | N.D. | 9.2 | N.D. | 9.1 | N.D. | 9.2 | N.D. | 9.8 |
| NH$_4$OH | N.D. | 9.1 | N.D. | 9.1 | N.D. | 9.3 | N.D. | 9.9 |
| pH = 12 | | | | | | | | |
| NaOH | N.D. | 9.9 | N.D. | 9.8 | N.D. | 9.8 | N.D. | 11.9 |
| NH$_4$OH | N.D. | 9.8 | N.D. | 9.8 | N.D. | 9.7 | N.D. | 12.0 |

(Note)
N.D. in Table 16 represents a value of detection limit 0.002 ppm or less.

TABLE 17

Leachin Test 4

| | Example 1 | | Example 2 | | Example 3 | |
|---|---|---|---|---|---|---|
| | Leached Cr (ppm) | pH | Leached Cr (ppm) | pH | Leached Cr (ppm) | pH |
| 80° C. | N.D. | 9.0 | N.D. | 9.1 | N.D. | 9.1 |
| 120° C. | N.D. | 9.1 | N.D. | 9.1 | N.D. | 9.2 |
| 200° C. | N.D. | 9.0 | N.D. | 9.2 | N.D. | 9.0 |
| 300° C. | N.D. | 9.1 | N.D. | 9.1 | N.D. | 9.1 |
| 400° C. | N.D. | 9.2 | N.D. | 9.2 | N.D. | 9.2 |

(Note)
N.D. in Table 17 represents a value of detection limit 0.02 ppm or less.

TABLE 18

Leaching Test 5 (Pulverized)

| | Example 1 | | Example 2 | | Example 3 | |
|---|---|---|---|---|---|---|
| | Leached Cr (ppm) | pH | Leached Cr (ppm) | pH | Leached Cr (ppm) | pH |
| 18.9 μm | N.D. | 8.7 | N.D. | 8.9 | N.D. | 9.1 |
| 15.2 μm | N.D. | 8.8 | N.D. | 9.0 | N.D. | 9.0 |
| 10.7 μm | N.D. | 8.8 | N.D. | 9.1 | N.D. | 8.9 |
| 7.6 μm | N.D. | 8.9 | N.D. | 9.0 | N.D. | 9.1 |

(Note)
N.D. in Table 18 represents a value of detection limit 0.02 ppm or less.

What is claimed is:

1. A fired spinel complex oxide produced by firing a mixture containing a slag by-produced in chromium refining, a reducer, and a material containing silica, the fired spinel complex oxide being essentially composed of:
    29 to 40 percent by weight of $Fe_2O_3$;
    15 to 20 percent by weight of $Al_2O_3$;
    9 to 14 percent by weight of MgO;
    0 to 4 percent by weight of $Na_2O$;
    9 to 17 percent by weight of $Cr_2O_3$;
    14 to 20 percent by weight of $SiO_2$; and
    2 percent by weight or less of CaO,
    wherein the fired spinel complex oxide has a diffraction intensity ratio b/a of 0.1 or less, the diffraction intensity ratio b/a being a ratio of the peak intensity b of the material containing silica in the vicinity of $2\theta=26.7°$ to the {113} plane peak intensity a in the vicinity of $2\theta=36°$ in the Cu—Kα X-ray diffraction pattern thereof.

2. A fired spinel complex oxide according to claim 1, wherein the fired spinel complex oxide comprises grains having a mean grain size in the range of 0.5 to 25 mm.

3. A fired spinel complex oxide according to claim 2, wherein the grains have a uniaxial compressive strength of 1 MPa or more.

4. A fired spinel complex oxide according to claim 2, wherein the fired spinel complex oxide has an apparent specific gravity in the range of 1.4 to 1.8 g/cm$^3$.

5. A fired spinel complex oxide according to claim 2, wherein the fired spinel complex oxide has a water absorption in the range of 16 to 23 percent by weight and a permeability coefficient in the range of 0.001 to 0.005 cm/s.

6. A method for preparing a fired spinel complex oxide, comprising:
    the first step of blending a slag by-produced in chromium refining, a reducer, a material containing silica, and water to prepare a mixture comprising particles having a mean grain size of 100 μm or less, the slag being essentially composed of 39 to 44 percent by weight of $Fe_2O_3$, 13 to 19 percent by weight of $Al_2O_3$, 10 to 14 percent by weight of MgO, 0 to 4 percent by weight of $Na_2O$, 13 to 20 percent by weight of $Cr_2O_3$, 2 percent by weight or less of CaO;
    the second step of subjecting the mixture to one of granulation and pressure forming to prepare a reaction precursor; and
    the third step of firing the reaction precursor at a temperature of 950° C. or more and subsequently cooling the fired product.

7. The method according to claim 6, the mixture prepared in the first step contains 4 to 13 parts by weight of the reducer in terms of carbon, 15 to 21 parts by weight of the material containing silica in terms of $SiO_2$, and 11 to 17 parts by weight of the water, relative to 100 parts by weight of the slag.

8. The method according to claim 6, wherein the slag is a residue of a process of oxidizing and roasting a mixture of a chrome ore and a sodium compound, and extracting sodium chromate by immersing the roasted material in water, the chrome ore being essentially composed of 25 to 34 percent by weight of $Fe_2O_3$, 13 to 20 percent by weight of $Al_2O_3$, 7 to 11 percent by weight of MgO, 44 to 48 percent by weight of $Cr_2O_3$, and 2 percent by weight or less of caO.

9. The method according to claim 6, wherein the water used in the first step is a sludge liquor.

10. The method according to claim 6, wherein the second step performs the granulation.

11. The method according to claim 10, wherein the granulated material has a mean grain size in the range of 0.5 to 25 mm.

12. The method according to claim 10, wherein the granulation is performed in the presence of a fired spinel complex oxide, the fired spinel complex oxide produced by firing a mixture containing a slag by-produced in chromium refining, a reducer, and a material containing silica, the fired spinel complex oxide being essentially composed of:
    29 to 40 percent by weight of $Fe_2O_3$;
    15 to 20 percent by weight of $Al_2O_3$;
    9 to 14 percent by weight of MgO;
    0 to 4 percent by weight of $Na_2O$;
    9 to 17 percent by weight of $Cr_2O_3$;
    14 to 20 percent by weight of $SiO_2$; and
    2 percent by weight or less of CaO,
    wherein the fired spinel complex oxide has a diffraction intensity ratio b/a of 0.1 or less, the diffraction intensity ratio b/a being a ratio of the peak intensity b of the material containing silica in the vicinity of $2\theta=26.7°$ to the {113} plane peak intensity a in the vicinity of $2\theta=36°$ in the Cu—Kα X-ray diffraction pattern thereof, and wherein the fired spinel complex oxide comprises grains having a mean grain size in the range of 0.5 to 25 mm.

13. The method according to claim 6, wherein the cooling is performed in a reducing atmosphere.

* * * * *